United States Patent
Kim et al.

(10) Patent No.: US 10,692,471 B2
(45) Date of Patent: Jun. 23, 2020

(54) DISPLAY APPARATUS AND CONTROL METHOD THEREOF

(71) Applicant: SAMSUNG ELECTRONICS CO., LTD., Suwon-si (KR)

(72) Inventors: Hye-suk Kim, Suwon-si (KR); Soon-mook Jeong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/712,384

(22) Filed: Sep. 22, 2017

(65) Prior Publication Data
US 2018/0090108 A1    Mar. 29, 2018

(30) Foreign Application Priority Data
Sep. 23, 2016    (KR) .................. 10-2016-0121803

(51) Int. Cl.
| | | |
|---|---|---|
| G09G 5/373 | (2006.01) | |
| G06F 3/14 | (2006.01) | |
| H04N 21/414 | (2011.01) | |
| H04N 21/4402 | (2011.01) | |
| H04N 21/4728 | (2011.01) | |
| G09G 5/14 | (2006.01) | |

(52) U.S. Cl.
CPC ........... *G09G 5/373* (2013.01); *G06F 3/1446* (2013.01); *G09G 5/14* (2013.01); *H04N 21/41415* (2013.01); *H04N 21/4402* (2013.01); *H04N 21/4728* (2013.01); *G09G 2340/04* (2013.01); *G09G 2356/00* (2013.01)

(58) Field of Classification Search
None
See application file for complete search history.

(56) References Cited

U.S. PATENT DOCUMENTS

| | | | |
|---|---|---|---|
| 6,501,441 B1 | 12/2002 | Ludtke et al. | |
| 10,078,793 B2 * | 9/2018 | Kim | ................ G06K 9/3233 |

(Continued)

FOREIGN PATENT DOCUMENTS

| | | |
|---|---|---|
| JP | 2006243200 A | 9/2006 |
| JP | 2007074675 A | 3/2007 |

(Continued)

OTHER PUBLICATIONS

Search Report dated Jan. 30, 2018, issued by the International Searching Authority in counterpart International Patent Application No. PCT/KR2017/010294 (PCT/ISA/210).

(Continued)

*Primary Examiner* — Ke Xiao
*Assistant Examiner* — Jed-Justin Imperial
(74) *Attorney, Agent, or Firm* — Sughrue Mion, PLLC

(57) ABSTRACT

A display apparatus is provided. The display apparatus includes: a display including a plurality of screens; an image receiver configured to receive an input image; and a processor configured to obtain at least one selected area within the input image, to convert the input image into an output image corresponding to an arranged shape of the plurality of screens such that at least one selected area in the output image, which corresponds to the at least one selected area of the input image, is displayed on a main part of the plurality of screens, and to output the output image for display on the plurality of screens.

20 Claims, 13 Drawing Sheets

(56) References Cited

U.S. PATENT DOCUMENTS

| | | |
|---|---|---|
| 2004/0078814 A1 | 4/2004 | Allen |
| 2006/0247855 A1* | 11/2006 | de Silva .................. G01C 21/36 701/454 |
| 2006/0282855 A1 | 12/2006 | Margulis |
| 2007/0139626 A1 | 6/2007 | Saleh et al. |
| 2011/0239265 A1 | 9/2011 | Hinic |
| 2013/0181901 A1 | 7/2013 | West |
| 2014/0002330 A1 | 1/2014 | Teramae et al. |
| 2014/0320534 A1 | 10/2014 | Kimura |
| 2015/0084836 A1 | 3/2015 | Velicescu |
| 2015/0310585 A1* | 10/2015 | Gupta .................... G06T 7/0085 382/199 |
| 2016/0077787 A1 | 3/2016 | Hosokawa |
| 2016/0248993 A1* | 8/2016 | Sato ..................... H04N 5/2628 |
| 2017/0157520 A1 | 6/2017 | Klarer |

FOREIGN PATENT DOCUMENTS

| | | |
|---|---|---|
| JP | 2008257127 A | 10/2008 |
| JP | 2011141424 A | 7/2011 |
| JP | 2013092735 A | 5/2013 |
| JP | 2014215604 A | 11/2014 |
| JP | 2016158115 A | 9/2016 |
| KR | 20030058143 A | 7/2003 |
| KR | 10-2008-0087572 A | 10/2008 |
| KR | 1020140002522 A | 1/2014 |
| WO | 2014174630 A1 | 10/2014 |
| WO | 2016/026587 A1 | 2/2016 |

OTHER PUBLICATIONS

Written Opinion dated Jan. 30, 2018, issued by the International Searching Authority in counterpart International Patent Application No. PCT/KR2017/010294 (PCT/ISA/237).

Communication dated Jun. 7, 2019, issued by the European Patent Office in counterpart European Application No. 17853401.2.

Communication dated Apr. 7, 2020 from the Japanese Patent Office in application No. 2019-513962.

* cited by examiner

FIG. 2
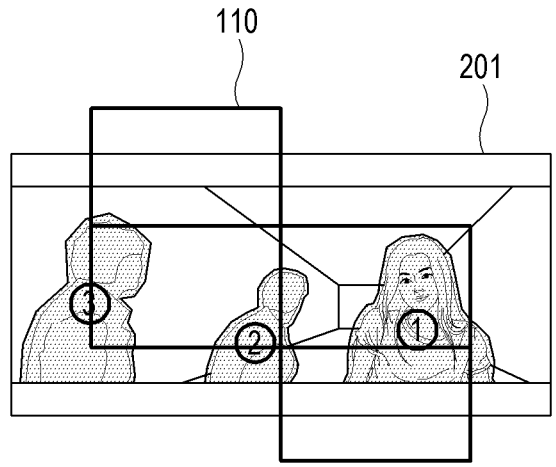
HOW MUCH THE FIRST SELECTED AREA
OCCUPIES SCREEN = 1 SCREEN
HOW MUCH THE SECOND SELECTED AREA
OCCUPIES SCREEN = 1/4 SCREEN
HOW MUCH THE THIRD SELECTED AREA
OCCUPIES SCREEN = 1/3 SCREEN
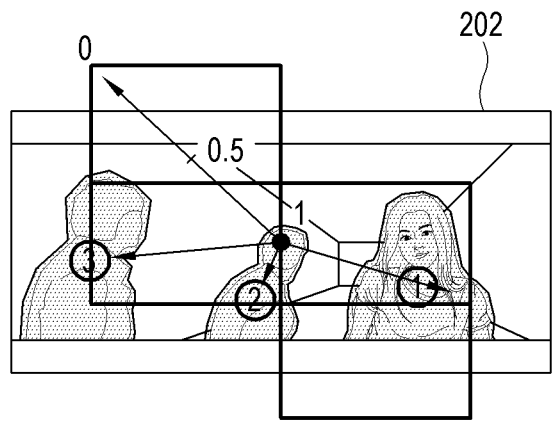
HOW CLOSE THE FIRST SELECTED AREA
IS TO CENTER OF SCREEN = 0.5
HOW CLOSE THE SECOND SELECTED AREA
IS TO CENTER OF SCREEN = 0.9
HOW CLOSE THE THIRD SELECTED AREA
IS TO CENTER OF SCREEN = 0.4

FIG. 3
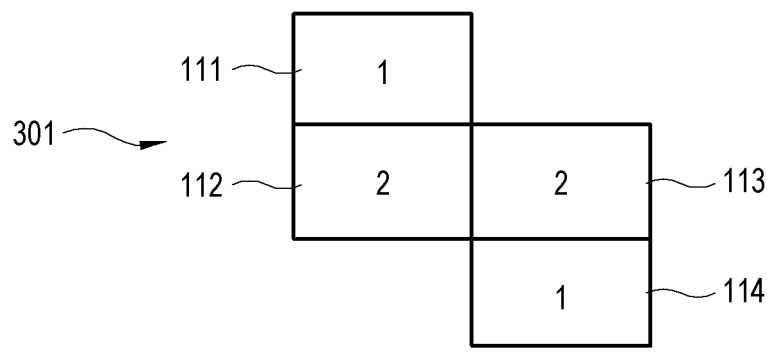
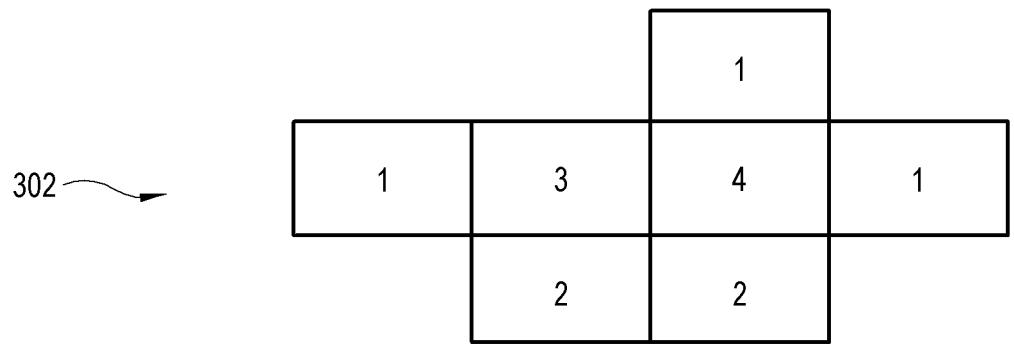
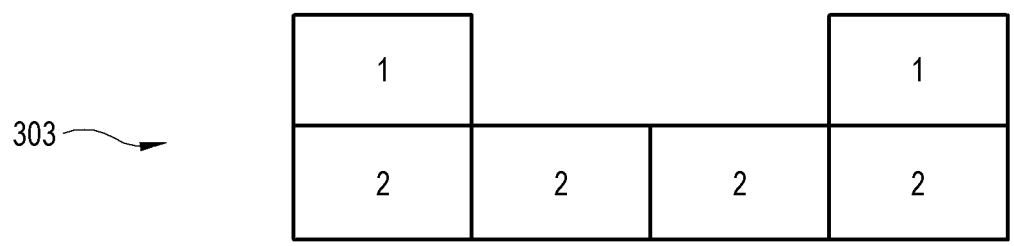
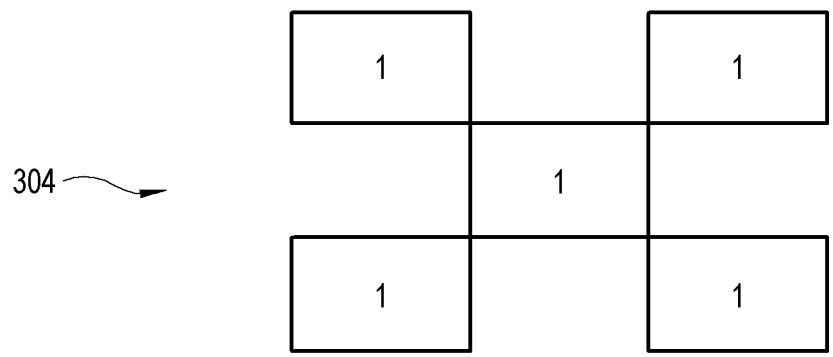

FIG. 4

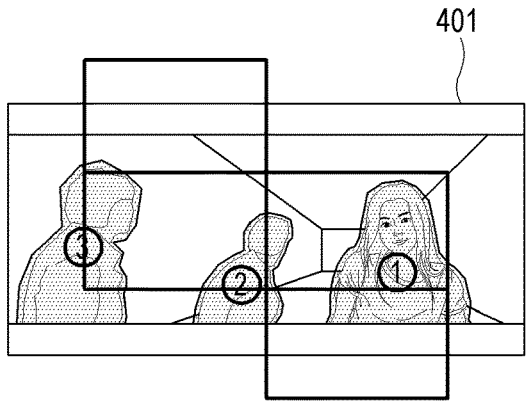
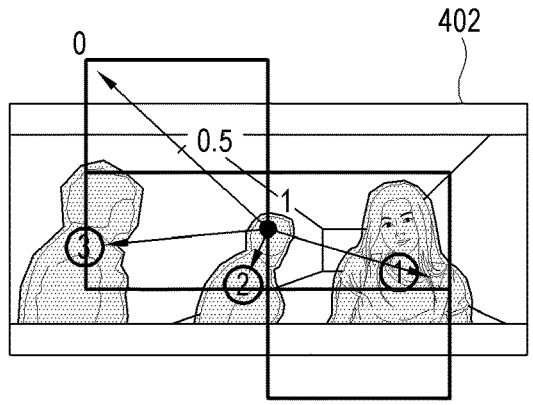

HOW MUCH THE FIRST SELECTED AREA OCCUPIES SCREEN = 1 SCREEN
HOW MUCH THE SECOND SELECTED AREA OCCUPIES SCREEN = 1/4 SCREEN
HOW MUCH THE THIRD SELECTED AREA OCCUPIES SCREEN = 1/3 SCREEN

HOW CLOSE THE FIRST SELECTED AREA IS TO CENTER OF SCREEN = 0.5
HOW CLOSE THE SECOND SELECTED AREA IS TO CENTER OF SCREEN = 0.9
HOW CLOSE THE THIRD SELECTED AREA IS TO CENTER OF SCREEN = 0.4

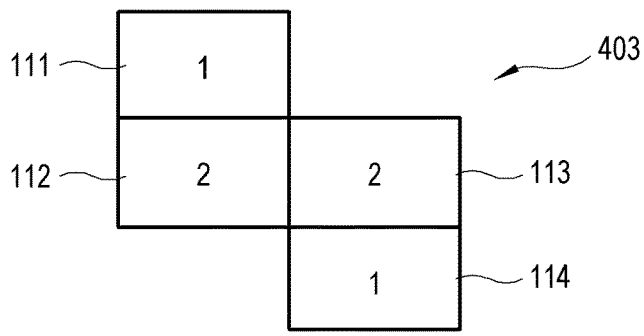

HOW IMPORTANT THE SCREEN DISPLAYING THE FIRST SELECTED AREA IS = (2/3 x 2) + (1/3 x 1) = 5/3
HOW IMPORTANT THE SCREEN DISPLAYING THE SECOND SELECTED AREA IS = 2
HOW IMPORTANT THE SCREEN DISPLAYING THE THIRD SELECTED AREA IS = 2

EMPHASIS LEVEL OF SELECTED AREA = OCCUPATION LEVEL OVER SCREEN x PROXIMITY LEVEL TO A CENTER OF SCREEN x IMPORTANCE LEVEL OF DISPLAY SCREEN

EMPHASIS LEVEL OF THE FIRST SELECTED AREA = 1 x 0.5 x 5/3 = 0.83
EMPHASIS LEVEL OF THE SECOND SELECTED AREA = 1/4 x 0.9 x 2 = 0.45
EMPHASIS LEVEL OF THE THIRD SELECTED AREA = 1/3 x 0.4 x 2 = 0.27

EMPHASIS LEVEL OF FOREGOING SELECTED AREAS
 = EMPHASIS LEVEL OF THE FIRST SELECTED AREA + EMPHASIS LEVEL OF THE SECOND SELECTED AREA + EMPHASIS LEVEL OF THE THIRD SELECTED AREA
 = 1.55

FIG. 5
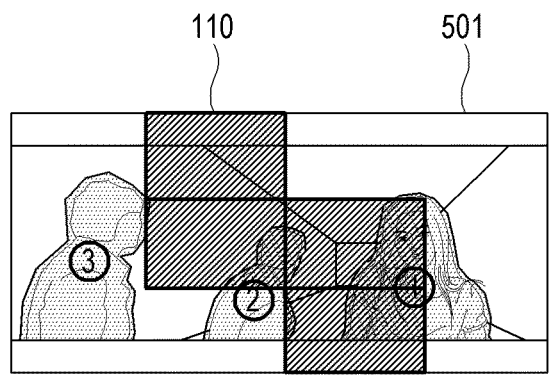
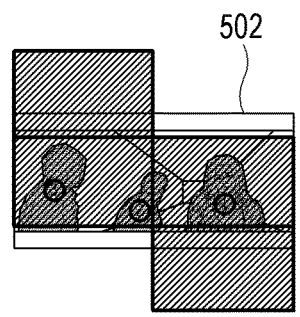
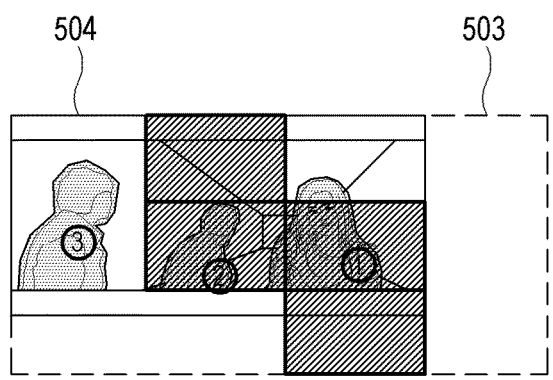
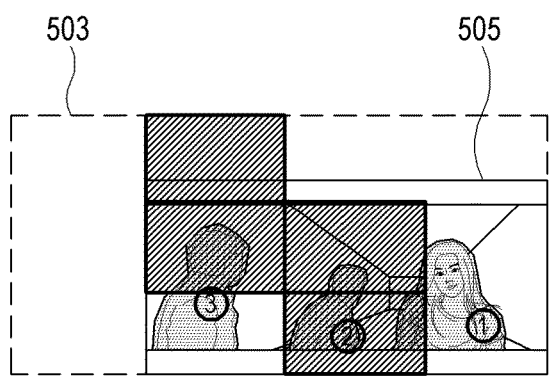

FIG. 8

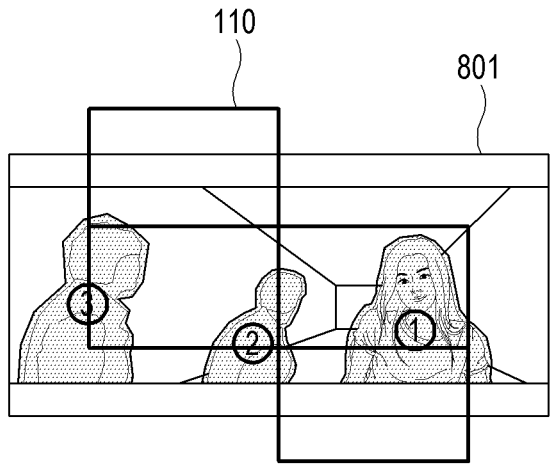

EMPHASIS LEVEL OF THE FIRST
SELECTED AREA = 1 x 0.5 x 5/3 = 0.83
EMPHASIS LEVEL OF THE SECOND
SELECTED AREA = 1/4 x 0.9 x 2 = 0.45
EMPHASIS LEVEL OF THE THIRD
SELECTED AREA = 1/3 x 0.4 x 2 = 0.27

EMPHASIS LEVEL OF SELECTED AREAS = 1.55

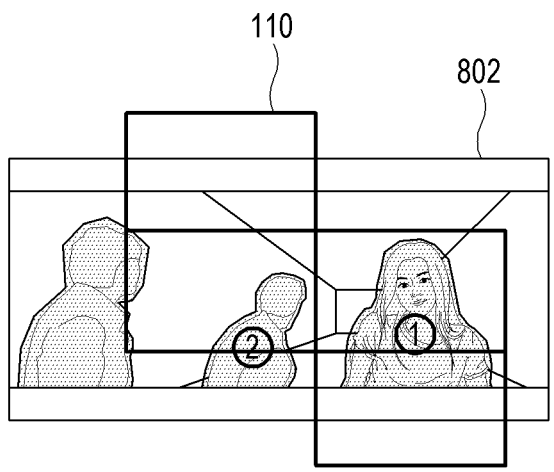

EMPHASIS LEVEL OF THE FIRST
SELECTED AREA = 1.2 x 0.7 x 5/3 = 1.4
EMPHASIS LEVEL OF THE SECOND
SELECTED AREA = 1/4 x 0.8 x 2 = 0.4
EMPHASIS LEVEL OF THE THIRD
SELECTED AREA = 1/20 x 0.3 x 2 = 0.03
EMPHASIS LEVEL OF SELECTED AREAS = 1.83

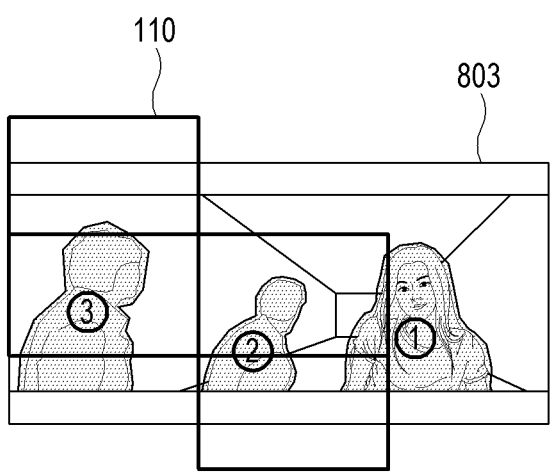

EMPHASIS LEVEL OF THE FIRST
SELECTED AREA = 1.6 x 0.3 x 5/3 = 0.08
EMPHASIS LEVEL OF THE SECOND
SELECTED AREA = 1/2 x 0.4 x 2 = 0.4
EMPHASIS LEVEL OF THE THIRD
SELECTED AREA = 2/3 x 0.7 x 2 = 0.93

EMPHASIS LEVEL OF SELECTED AREAS = 1.41

FIG. 9

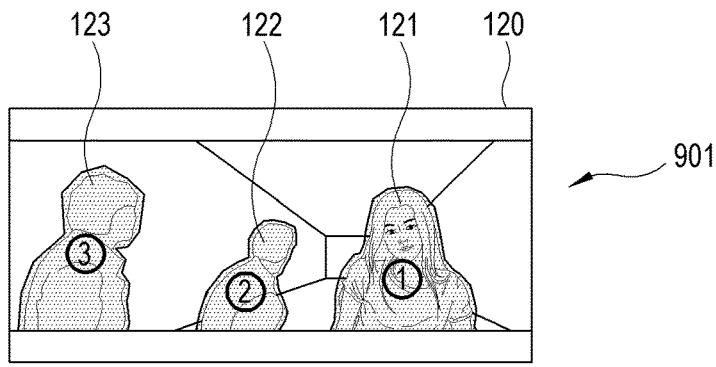

IMPORTANCE LEVEL OF THE FIRST SELECTED AREA = 0.9
IMPORTANCE LEVEL OF THE SECOND SELECTED AREA = 0.7
IMPORTANCE LEVEL OF THE THIRD SELECTED AREA = 0.5

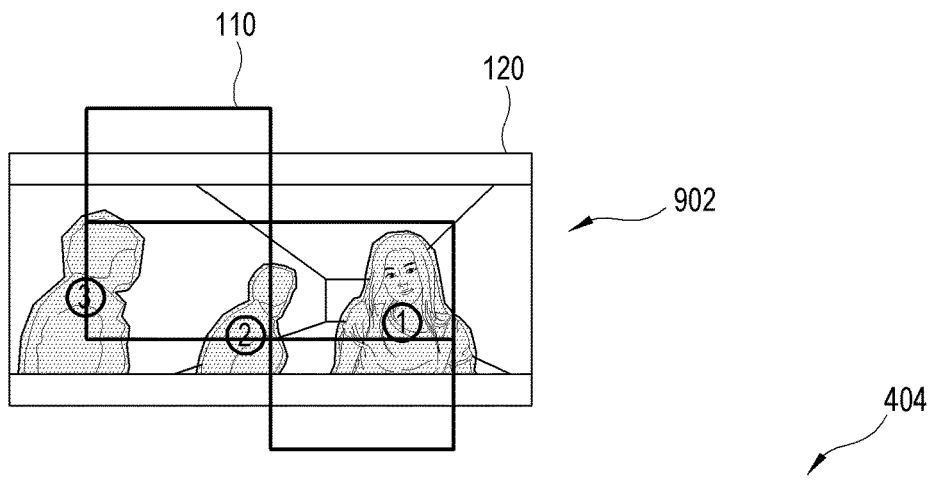

EMPHASIS LEVEL OF SELECTED AREA = OCCUPATION LEVEL OVER SCREEN x PROXIMITY LEVEL TO A CENTER OF SCREEN x IMPORTANCE LEVEL OF DISPLAY SCREEN x IMPORTANCE LEVEL OF SELECTED AREA

EMPHASIS LEVEL OF THE FIRST SELECTED AREA
= 1 x 0.5 x 5/3 x 0.9 = 0.75
EMPHASIS LEVEL OF THE SECOND SELECTED AREA
= 1/4 x 0.9 x 2 x 0.7 = 0.315
EMPHASIS LEVEL OF THE THIRD SELECTED AREA
= 1/3 x 0.4 x 2 x 0.5 = 0.135

EMPHASIS LEVEL OF FOREGOING SELECTED AREAS
= EMPHASIS LEVEL OF THE FIRST SELECTED AREA + EMPHASIS LEVEL OF THE SECOND SELECTED AREA + EMPHASIS LEVEL OF THE THIRD SELECTED AREA
= 1.2

DISPLAY APPARATUS AND CONTROL METHOD THEREOF

CROSS-REFERENCE TO RELATED APPLICATION

The application claims priority from Korean Patent Application No. 10-2016-0121803, filed on Sep. 23, 2016 in the Korean Intellectual Property Office, the disclosure of which is incorporated herein by reference in its entirety.

BACKGROUND

Field

Apparatuses and methods consistent with one or more exemplary embodiments relate to a display apparatus and a control method thereof, and more particularly, to a display apparatus for displaying an image on a plurality of screens and a control method thereof.

Description of the Related Art

Multi-display technology relates to the use of multiple displays as a single display. In accordance with how the multiple displays are arranged and connected, a screen formed by combining the multiple displays may have various shapes. A rectangle is a typical shape of the combined screen formed by the multiple displays, in which the rows and columns of the combined screen are filled with the displays. However, the shape of the combined screen is not limited to a rectangle, and the displays may be connected in various shapes.

In a case where the combined screen has a typical rectangular shape, there generally may be no problem with displaying an image on such a typical screen. Since most of the images to be displayed on the screen have a rectangular shape like the screen, it is possible to display the image on the combined screen without any loss of the image by adjusting the output image to the horizontal and vertical lengths of the combined screen.

On the other hand, if the combined screen has an untypical shape and is to display a rectangular image, there may be a problem in that a portion of the image is not displayed on the screen since the image and the screen are different in shape. This problem may exist even though the output image is adjusted to the horizontal and vertical lengths of the combined screen in the same manner as when the combined screen has a rectangular shape. This problem is exacerbated if an important portion of the image is not displayed as a result of the difference in shape between the combined screen and the image.

If the image is displayed on only the largest rectangular area of the combined screen, it is inefficient since the rest of the combined screen is not in use.

SUMMARY

Aspects of one or more exemplary embodiments provide a display apparatus that displays an image with less loss on a plurality of screens.

Aspects of one or more exemplary embodiments provide a display apparatus that displays an image with minimum loss of an important portion on a plurality of screens.

According to an aspect of an exemplary embodiment, there is provided a display apparatus including: a display including a plurality of screens; an image receiver configured to receive an input image; and a processor configured to obtain at least one selected area within the input image, to convert the input image into an output image corresponding to an arranged shape of the plurality of screens such that at least one selected area in the output image, which corresponds to the at least one selected area of the input image, is displayed on a main part of the plurality of screens, and to output the output image for display on the plurality of screens.

The processor may be further configured to convert the input image into an output image such that the at least one selected area in the output image has an emphasis level greater than or equal to a predetermined level, and determine the emphasis level based on at least one of: how much each of the at least one selected area occupies the plurality of screens; how close each of the at least one selected area is to a center of the plurality of screens; and an importance level of a screen, among the plurality of screens, for displaying each of the at least one selected area.

The processor may be further configured to convert the input image into the output image by performing at least one of scaling the input image and a position shift for the input image on the plurality of screens.

The processor may be further configured to determine the output image as having a greatest emphasis level from among a plurality of candidate output images obtained by gradually changing an extent of at least one of the scaling and the position shift.

The processor may be further configured to determine the output image as having a greatest emphasis level from among a plurality of candidate output images obtained by gradually changing an extent of at least one of the scaling and the position shift starting from a state in which a center of an image portion including at least one area of the input image among the at least one selected area is aligned with a center of the plurality of screens.

The processor may be further configured to determine the emphasis level based on an importance level of each of the at least one selected area.

The importance level of each of the at least one selected area may include at least one of a size, a position, and a display frequency of each area in the input image.

The processor may be further configured to determine the output image as having a greatest emphasis level from among a plurality of candidate output images obtained by gradually changing an extent of at least one of the scaling and the position shift from a state in which an area determined to have a greatest importance level among the at least one selected area of the input image is positioned on a center of the plurality of screens.

The processor may be further configured to crop a portion of the input image to convert into the output image.

The cropped portion of the input image may include an image between a first selected area and a second selected area among the at least one selected area.

According to an aspect of another exemplary embodiment, there is provided a method of controlling a display apparatus including a plurality of screens, the method including: receiving an input image; obtaining at least one selected area within the received input image; converting the received input image into an output image corresponding to an arranged shape of the plurality of screens such that at least one selected area in the output image, which corresponds to the at least one selected area of the input image, is displayed on a main part of the plurality of screens; and outputting the output image for display on the plurality of screens.

The converting may include converting the input image into an output image such that the at least one selected area in the output image has an emphasis level greater than or equal to a predetermined level, and determining the emphasis level based on at least one of: how much each of the at least one selected area occupies the plurality of screens; how close each of the at least one selected area is to a center of the plurality of screens; and an importance level of a screen, among the plurality of screens, for displaying each of the at least one selected area.

The converting may include converting the input image into the output image by performing at least one of scaling the input image and a position shift for the input image on the plurality of screens.

The converting may further include determining the output image as having a greatest emphasis level from among a plurality of candidate output images obtained by gradually changing an extent of at least one of the scaling and the position shift.

The converting may further include determining the output image as having a greatest emphasis level from among a plurality of candidate output images obtained by gradually changing an extent of at least one of the scaling and the position shift starting from a state in which a center of an image portion including at least one area among the at least one selected area of the output image is aligned with a center of the plurality of screens.

The converting may include determining the emphasis level based on an importance level of each of the at least one selected area.

The importance level of each of the at least one selected area may include at least one of a size, a position, and a display frequency of each area in the input image.

The converting may include determining the output image as having a greatest emphasis level from among a plurality of candidate output images obtained by gradually changing an extent of at least one of the scaling and the position shift from a state in which an area determined to have a greatest importance level among the at least one selected area of the output image is positioned on a center of the plurality of screens.

The converting may include cropping a portion of the input image to convert into the output image.

The cropped portion of the input image may include an image between a first selected area and a second selected area among the at least one selected area.

According to an aspect of another exemplary embodiment, there is provided a non-transitory computer readable recording medium having recorded thereon a program executable by a computer for performing the method.

According to an aspect of another exemplary embodiment, there is provided a computer program product comprising a computer readable medium having a computer program stored thereon, which, when executed by a computing device, cause the computing device to perform the method.

The computer readable program may be stored in the computer readable storage medium in a server and downloaded over a network to the computing device.

According to an aspect of another exemplary embodiment, there is provided an image processing apparatus including: an image receiver configured to receive an input image; and a processor configured to convert the input image into an output image corresponding to an arranged shape of a plurality of screens such that at least one selected area within the input image has an emphasis level greater than or equal to a predetermined level in the output image.

The processor may be further configured to determine the emphasis level based on at least one of: how much each of the at least one selected area occupies the plurality of screens; how close each of the at least one selected area is to a center of the plurality of screens; and an importance level of a screen, among the plurality of screens, for displaying each of the at least one selected area.

The processor may be further configured to convert the input image into the output image by performing at least one of scaling the input image and a position shift for the input image on the plurality of screens.

The processor may be further configured to determine the output image as having a greatest emphasis level from among a plurality of candidate output images obtained by gradually changing an extent of at least one of the scaling and the position shift.

The processor may be further configured to determine the output image as having a greatest emphasis level from among a plurality of candidate output images obtained by gradually changing an extent of at least one of the scaling and the position shift starting from a state in which a center of an image portion including at least one area among the at least one selected area is aligned with a center of the plurality of screens.

The processor may be further configured to determine the output image as having a greatest emphasis level from among a plurality of candidate output images obtained by gradually changing an extent of at least one of the scaling and the position shift from a state in which an area determined to have a greatest importance level among the at least one selected area is positioned on a center of the plurality of screens.

BRIEF DESCRIPTION OF THE DRAWINGS

The above and/or the aspects will become apparent and more readily appreciated from the following description of exemplary embodiments, taken in conjunction with the accompanying drawings, in which:

FIG. 2 illustrates an occupying area of each selected area relative to a combined screen and a closeness of each selected area to the center of the combined screen, as examples of factors for determining the emphasis level of each selected area according to an exemplary embodiment;

FIG. 3 illustrates an importance of each screen for displaying each selected area as an example of a factor for determining an emphasis level according to an exemplary embodiment;

FIG. 4 illustrates an example of calculating an emphasis level according to an exemplary embodiment;

FIG. 5 illustrates an example of conversion ranges for scaling and a position-shift as methods of converting an input image according to an exemplary embodiment;

FIG. 8 illustrates an example of calculating the emphasis level according to images based on another example of processes in the display apparatus according to an exemplary embodiment;

FIG. 9 illustrates an importance of a selected area as an example of factors for determining an emphasis level according to an exemplary embodiment;

DETAILED DESCRIPTION OF EXEMPLARY EMBODIMENTS

Below, exemplary embodiments will be described in more detail with reference to accompanying drawings. However, the structures and functions illustrated in the following exemplary embodiments are not construed as limiting the present inventive concept and the key structures and functions. In the following descriptions and accompanying drawings, detailed descriptions about publicly known functions or elements may be omitted if it is determined that they cloud the gist of the present inventive concept.

In the following descriptions, a singular expression may involve a plural expression as long as it does not clearly give different meaning contextually. In the following descriptions, terms such as "comprise," "include" or "have" do not exclude presence or addition of one or more other features, numbers, steps, operations, elements, components or combination thereof. In addition, a "module" or a "portion" may perform at least one function or operation, be achieved by hardware or software or combination of hardware and software, and a plurality of "modules" or a plurality of "portions" may be modularized into at least one processor.

Furthermore, it will be understood that, although the terms "first," "second," etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure. As used herein, the term "and/or" and the term "at least one of" includes any and all combinations of one or more of the associated listed items.

Figure 1:
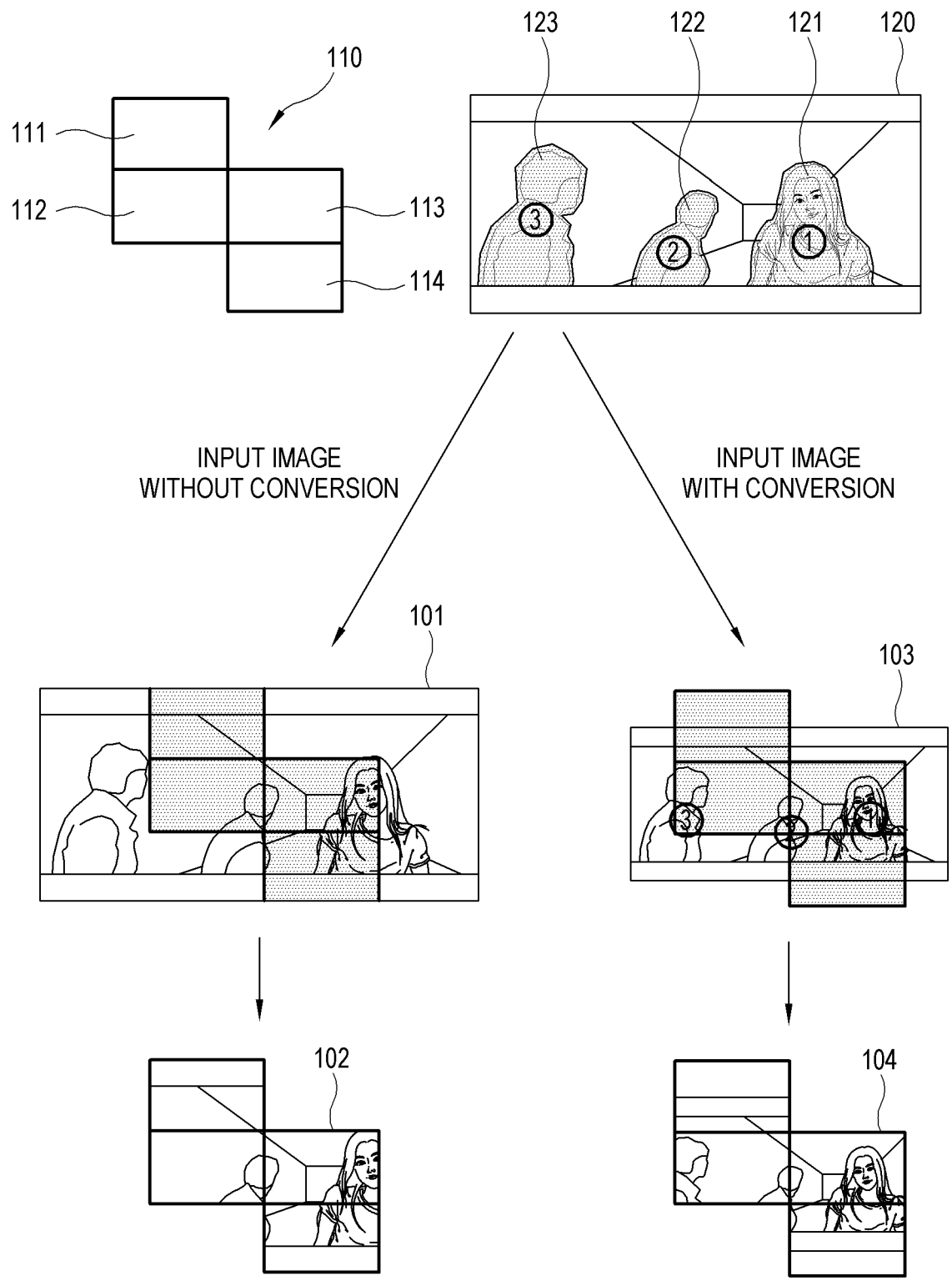
FIG. 1 illustrates schematic operations of a display apparatus according to an exemplary embodiment.

FIG. 1 illustrates schematic operations of a display apparatus according to an exemplary embodiment. The display apparatus according to an exemplary embodiment may be, but is not limited to, a television (TV), a smart phone, a tablet computer, a mobile phone, a personal computer, a multimedia player, an electronic frame, a digital billboard, a large format display (LFD), a signage, a set-top box, a smart watch, a wearable device such as a head-mounted display (HMD), a smart home appliance such as a refrigerator, and the like apparatus capable of processing and outputting a received image.

Referring to FIG. 1, the display apparatus includes a plurality of screens 110. The respective screens 111-114 may display different images independently of one another, or the plurality of screens 110 may connect with one another and display one image as a combined or united screen. The respective screens 111-114 may be or include separate display modules or processors, or may be areas individually divided and controlled by one display module or processor.

The plurality of screens 110 may belong to a single display apparatus, or the screens 111-114 may respectively belong to separate display apparatuses. In the latter case, another display apparatus (or dedicated or separate image processing apparatus that may or may not include a display screen) may be separately used for integrally controlling the respective screens 111-114, or one of the connected display apparatuses may be dynamically set while the display apparatuses are freely connected one-by-one like blocks, so as to integrally control the combined display apparatuses without any separate or dedicated display apparatus for that purpose. In accordance with how the respective screens 111-114 are arranged and connected, the combined screen formed by the plurality of screens 100 may have various shapes. For example, the combined screen may be freely shaped as illustrated in FIG. 3 (301, 302, 303, and 304) or may be a rectangle of which rows and columns are fully filled with the respective screens 111-114.

In the present exemplary embodiment, the display apparatus is configured to receive an input image 120. The input image is an image to be subject to conversion and/or image processing and to displayed on the plurality of screens, and includes at least one of a broadcasting program, an image, a moving image, a three-dimensional (3D) image, a 360/virtual reality (VR) image, and the like. The input image may be any image that is displayable on the screen of the display apparatus. Further, there are no specific limits to contents of the input image, and there are no specific limits to a path (e.g., propagation, distribution, cabled, or broadcast path) for receiving the input image. The input image may be received from the outside of the display apparatus through a communicator, a tuner, an interface (e.g., HDMI) or the like, or may be read from an internal storage of the display apparatus. In addition, there are no specific limits to the shape of the input image. For convenience of description, the input image having a rectangular input will be representatively described below.

The display apparatus in the present exemplary embodiment converts (or is configured to convert) the input image 120 into an output image 103 corresponding to the arranged shape of the plurality of screens 110 and then displays the output image 103 on the plurality of screens (104). Here, the plurality of screens 110 may have various shapes, and the input image 120 is converted according to the shape of the plurality of screens 110 so that the input image 120 can be properly displayed on the plurality of screens 110. As a method of converting the input image 120 into the output image 103, the input image may be enlarged or reduced (hereinafter, referred to as "scaling"), and/or position-shifted with respect to the plurality of screens 110. Details of the converting method will be described below.

The display apparatus converts the input image 120 into the output image 103 such that at least one selected area in the output image 103, which corresponds to at least one selected area 121-123 selected within the input image 120 (hereinafter, referred to as a "selected area"), is displayed on a main part of the plurality of screens. The main part of the plurality of screens includes a part, for example but not limited to, that is easily visible by a user within the plurality of screens.

The display apparatus may further converts the input image 120 into the output image 103 so that at least one selected area in the output image 103, which corresponds to at least one area 121-123 selected within the input image 120, has an emphasis level greater than or equal to a predetermined level.

The selected areas 121-123 are partial areas of the input image 120, such that corresponding area to which, in the output image, are desired to be displayed on the main part of the plurality of screens or are desired to be displayed with the emphasis level greater than or equal to a predetermined level on the plurality of screens 110 irrespective of the shape of the plurality of screens 110 when combined. The selected areas 121-123 are used as criteria for evaluating the output image 103 converted from the input image 120 to correspond to the arranged shape of the plurality of screens 110. The selected areas 121-123 may be selected by a user or may be selected by the display apparatus. If the selected areas 121-123 are selected by the display apparatus, the display apparatus may select at least one of the areas by analyzing the input image, for example, considering at least one of the sizes, positions, display frequencies (e.g., across a plurality or a predetermined number of image frames), etc., of objects within the input image.

In the present exemplary embodiment, the emphasis level refers to how the area in the output image 103, which corresponding to the selected areas 121-123 of the input image 120, are noticeably displayed or stand out to a user of the display apparatus when displaying the output image 103. The emphasis level may be determined or evaluated by various factors such as the type or content of the input image or an image within the selected area, a user's taste or preference, a purpose of displaying the image, etc. For example, the emphasis level may reflect or be based on at least one of how much the area in the output image 103, which corresponding to the selected area if the input image 120, occupies the plurality of screens, how close the area is to the center of the plurality of screens, how important the screen for displaying the area is among the plurality of screens, etc. In the present exemplary embodiment, the display apparatus converts the input image 120 so that the emphasis levels of the area in the output image 103, which corresponds to the selected areas 121-123 of the input image 120, calculated, determined, or obtained by the foregoing factors is greater than or equal to a predetermined level. The predetermined level may be set in accordance with how high the emphasis levels of the area in the output image 103, which corresponds to the selected areas 121-123 of the input image 120, are desired to be in the output image 103. If an output image converted from the input image is desired to have the maximum emphasis level among a plurality of selectable output images (e.g., a highest emphasis level among the emphasis levels of the plurality of selectable output images), the predetermined level may be set with a "maximum level." The predetermined level may be previously set in the display apparatus, may be set by a user, may be received from a server or other external apparatus, etc.

Referring to FIG. 1, a result from the foregoing conversion operations of the display apparatus according to an exemplary embodiment will be described below as compared with a result without the foregoing conversion operations. In the case where the input image 120 is displayed on the arranged plurality of screens 110, if the input image 120 is converted to just correspond to a vertical length of the plurality of screens 110 without applying a conversion method according to one or more exemplary embodiments, an output image 101 is displayed on the plurality of screens 102 with notable omissions since the vertical length of the arranged plurality of screens 110 is longer than a horizontal length.

On the other hand, where a conversion method according to one or more exemplary embodiments is applied to the plurality of screens 110 and the input image 120, a selected area and an emphasis level of the selected area are taken into account. For example, the display apparatus according to an exemplary embodiment or a user may select or determine selected areas 121-123 (i.e., a first selected area 121, a second selected area 122, and a third selected area 123). The display apparatus according to an exemplary embodiment converts the input image 120 to cause the selected areas 121-123 to have the emphasis levels greater than or equal to a predetermined level so that an output image 103 can be displayed on the plurality of screens 104. As compared to the output image 103 displayed according to the present exemplary embodiment, the output image 101 shows a trimmed face of the first selected area 121 and does not show the third selected area 123. Meanwhile, the output image 103 displayed according to the present exemplary embodiment shows the face of the first selected area 121 without being trimmed and partially shows the third selected area 123. Thus, according to an exemplary embodiment, at least one area selected within the input image is displayed with less loss when the input image is displayed on the plurality of screens.

Below, an example of factors for determining the emphasis level according to an exemplary embodiment and an example of calculating the emphasis level based on the factors, according to one or more exemplary embodiments, will be described with reference to FIGS. 2 to 4.

FIG. 2 illustrates an occupying area of each selected area relative to a combined screen 110 and a closeness of each selected area to the center of the combined screen 110, as examples of factors for determining the emphasis level of each selected area according to an exemplary embodiment. FIG. 2 at reference numeral 201 shows how much each selected area occupies the combined screen 110, i.e., an occupying area value or level of each selected area relative to the combined screen 110. If three selected areas 121-123 are selected or determined within the input image 120 (such as the input image 120 of FIG. 1), the respective emphasis levels depend on how much each selected area occupies the combined screen 110. Assuming that "1" is a value given to a case of occupying one screen among the plurality of screens, each selected area occupies the combined screen 110 as follows: the first selected area 121 has an occupying area value of "1" (i.e., occupies the combined screen 110 by as much as "1"), the second selected area 122 has an occupying area value of "¼," and the third selected area 123 has an occupying area value of "⅓."

Reference numeral 202 of FIG. 2 shows how close each selected area is to the center of the combined screen 110, i.e., a closeness value or level of each selected area relative to the center of the combined screen 110. If three selected areas 121-123 are selected or determined within the input image 120 (such as the input image 120 of FIG. 1), the respective emphasis levels depend on how close each selected area is to the center of the combined screen 110. Assuming that "1" is a value given to the closest area to the center of the combined screen 110 and "0" is a value given to the farthest area from the center of the combined screen 110, each selected area has a closeness value relative to the center of the combined screen 110 as follows: the first selected area 121 has a closeness value of "0.5" (i.e., is close to the center of the combined screen 110 by as much as "0.5"), the second selected area 122 has a closeness value of "0.9," and the third selected area 123 has a closeness value of "0.4." For reference, the center of the combined screen 110 is just given as one of exemplary areas where a user's eyes are focused or centered on most when viewing the combined screen 110. Alternatively, another position on which a user's eyes are likely to be kept may be used as a criterion. According to another exemplary embodiment, the center of the combined screen 110 may be determined based on at least one of the number, the sizes, and the relative arrangement of the screens included in the combined screen 110. For example, the center may be determined as being located at a middle point of an overall horizontal length of the combined screen, and/or at a middle point of an overall vertical height of the combined screen.

FIG. 3 illustrates an importance of each screen for displaying the selected area as an example of a factor for determining the emphasis level according to an exemplary embodiment. Importance levels (e.g., priority or relative importance values) for each screen in the combined screen may be calculated, determined, or obtained based on at least one of the size, position, resolution, etc., of each screen. For example, FIG. 3 illustrates a method of calculating the importance level based on the number of screens adjacent to each screen. In this case, a screen is given a higher importance value if more screens are adjacent thereto.

For example, referring to reference numeral 301 of FIG. 3, "1" is given as the importance level or value of a screen 111 since only one screen 112 is adjacent to the screen 111. On the other hand, "2" is given as the importance level of the screen 112 since two screens 111 and 113 are adjacent to the screen 112. In such a manner, the screens 113 and 114 have importance levels of "2" and "1," respectively.

FIG. 3 at reference numerals 302 to 304 show the calculated importance level of each screen on the center thereof in the variously arranged screens, calculated or determined as described above with respect to reference numeral 301.

FIG. 4 illustrates an example of calculating an emphasis level according to an exemplary embodiment. The emphasis level may be calculated based on one or more (e.g., all) of the foregoing factors, i.e., an occupying area of each selected area relative to a combined screen, a closeness of each selected area to the center of the combined screen, and an importance of each screen for displaying the selected area(s). FIG. 4 shows an example of calculating the emphasis level based on all of the foregoing factors. The shape of the combined screen, the input image, the selected area, and the output image of FIG. 4 are the same as those of FIGS. 1 and 2, and the results of calculating an occupying area of each selected area relative to a combined screen and a closeness of each selected area to the center of the combined screen 110, as shown by reference numerals 401 and 402 of FIG. 4, are the same as those of FIG. 2. FIG. 4 at reference numeral 403 shows the results of calculating the importance level with respect to each screen for displaying each selected area. A portion (about $2/3^{rds}$) of the first selected area 121 is displayed on the screen 113 and the remaining portion (about $1/3^{rd}$) of the first selected area 121 is displayed on the screen 114. Further, the importance levels of the screens 113 and 114 are "2" and "1," respectively. Therefore, the screens displaying the first selected area have an importance level of $(2/3 \times 2)+(1/3 \times 1)=5/3$. Likewise, the second selected area 122 and the third selected area 123 are partially displayed on screens that each have an importance level of "2." Therefore the screens for displaying the second and third selected areas also have the importance level of "2".

According to an exemplary embodiment, the emphasis level for a selected area may be determined by multiplying the occupying area level, the closeness level, and the importance level for the selected area. Additionally, according to an exemplary embodiment, the emphasis level of all of the selected areas with respect to an output image 401 may be determined by summing the emphasis levels of the respective selected areas. FIG. 4 at reference numeral 404 shows the foregoing calculation process. If the emphasis level of the selected area is calculated based on at least one among the occupying area level of each selected area, the closeness level of each selected area relative to the center of the screen, and the importance level of the screen for displaying each selected area, the corresponding selected area is more fully displayed on the plurality of screens, is displayed more closely to the center, and/or is displayed on a more important screen.

Details of converting the input image into the output image according to an exemplary embodiment will be described with reference to FIG. 5. The display apparatus according to an exemplary embodiment may convert the input image into the output image by performing at least one of scaling the input image and shifting the position of the input image with respect to the plurality of screens. Certain conversion ranges may be set for each of the scaling and the position shift. FIG. 5 illustrates an example of conversion ranges for the scaling and the position-shift. Referring to FIG. 5, the combined screen including the plurality of screens 110 has a vertical length that is longer than a horizontal length.

FIG. 5 at reference numerals 501 and 502 illustrates an upper limit and a lower limit of the scaling for the input image, respectively. In a case where the vertical length of the combined screen is longer than the horizontal length, the scaling may be performed to make the vertical length of the converted image be no longer than (or less than or equal to) the vertical length of the combined screen. If the vertical length of the converted image is longer than the vertical length of the combined screen, the converted image is larger than the combined screen with respect to both the horizontal and vertical lengths. Therefore, the upper limit is given as shown in FIG. 5 at reference numeral 501 so that the scaling is performed so as not to enlarge the input image beyond the upper limit. In addition, the scaling may be performed to make the horizontal length of the converted image be no shorter than the horizontal length of the combined screen. On the other hand, if the horizontal length of the converted image is shorter than the horizontal length of the combined screen, the combined screen may have an excessively large idle area in which no image is displayed. Therefore, the lower limit is given as shown in FIG. 5 at reference numeral 502 so that the scaling is performed so as not to reduce the input image beyond the lower limit.

FIG. 5 at reference numerals 504 and 505 show both edge ranges of the position shift for the input image, respectively. In a case where the input image is position-shifted on the plurality of screens, a left upper end point for the position shift may be set as shown in FIG. 5 at reference numeral 504 so that the upper and right edges of the converted image can be respectively aligned with the upper and right edges of the combined screen. If the position of the input image is shifted more upward or leftward than that of reference numeral 504, the combined screen has an excessively large idle area. On the other hand, a right lower end point for the position shift may be set as shown in FIG. 5 at reference numeral 505 so that the lower and left edges of the converted image can be respectively aligned with the lower and left edges of the combined screen. If the position of the input image is shifted more downward or rightward than that of FIG. 5 505, the combined screen has an excessively large idle area.

Since certain conversion ranges are set for each of the scaling and the position shift in converting the input image into the output image, the display apparatus may gradually adjust the extent of at least one of the scaling and the position shift, thereby determining an output image so that the selected area can have the maximum emphasis level within the output image (hereinafter, referred to as an "output image searching job"). In this regard, overall processes for receiving the input image and displaying the output image on the plurality of screens by the display apparatus according to an exemplary embodiment will be described with reference to FIG. 6.

Figure 6:
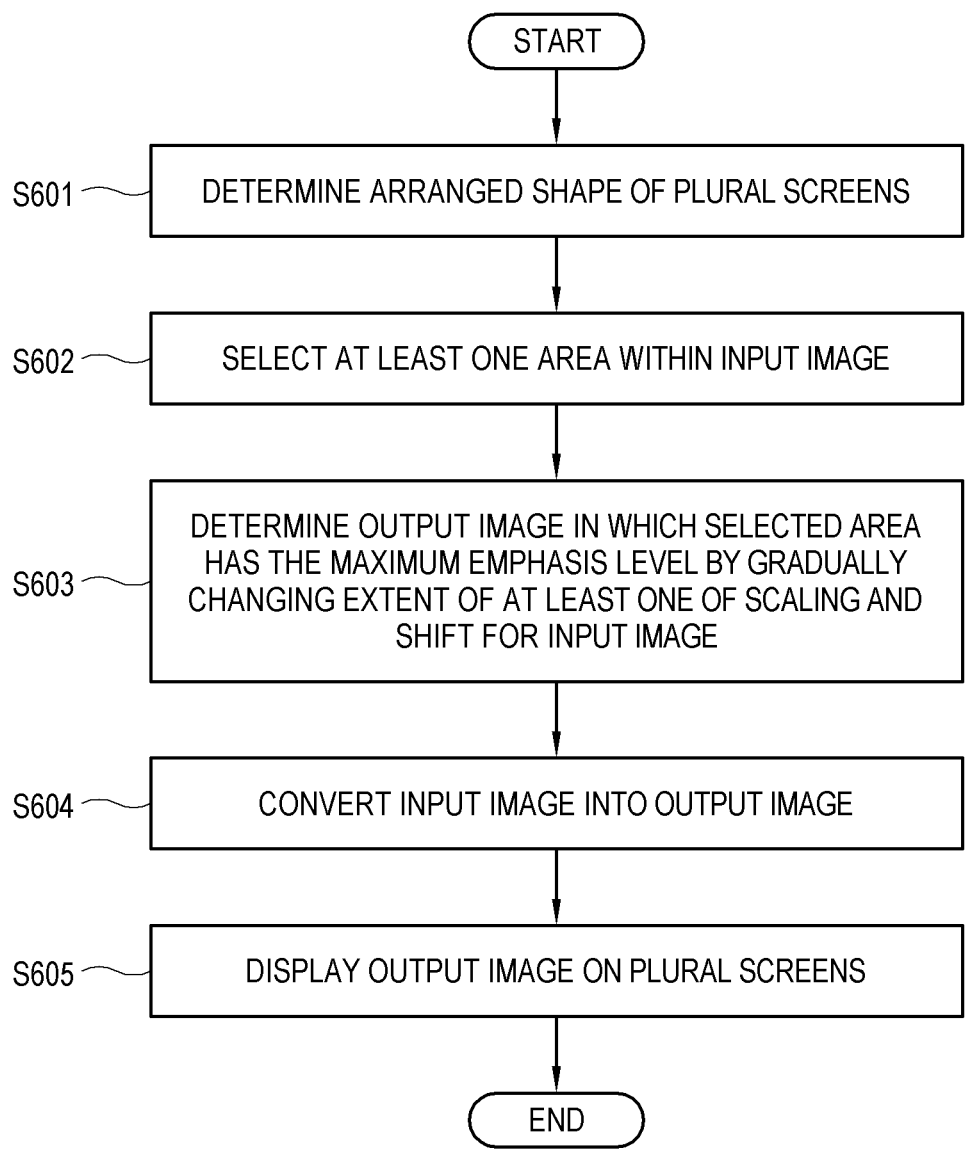
FIG. 6 illustrates a flowchart for a method of converting an input image into an output image according to an exemplary embodiment.

Referring to FIG. 6, the display apparatus according to the present exemplary embodiment determines or obtains the arranged shape of the plurality of screens (operation S601). Further, the display apparatus selects at least one area of which an emphasis level will be calculated within an input image (operation S602). The selection of the area may be based on a user's input or may be performed automatically by the display apparatus (e.g., by one or more hardware processors via an image analysis such as at least one of an object recognition, a background recognition, a focal point recognition, etc.). Then, the display apparatus determines an output image of which the selected area has the maximum emphasis level, while gradually changing the extent of at least of the scaling and the position shift (operation S603). The output image may be determined by calculating and comparing the emphasis levels of all the converted images which are subjected to the scaling and the position shift within the conversion ranges between the lower and upper limits. However, it is understood that one or more other exemplary embodiments are not limited thereto. For example, according to another exemplary embodiment, the extent of at least one of the scaling and the position shift may be gradually changed or adjusted until an output image is determined to have an emphasis level for the selected area(s) that is greater than or equal to a predetermined value (e.g., a threshold value). When the output image is determined, the display apparatus converts the input image into an output image matching with or corresponding to the determined output image (operation S604). Further, the converted output image is displayed on the plurality of screens (operation S605). Thus, the selected area(s) is displayed on the combined screen so that the selected area(s) can have the maximum emphasis level (or, according to another exemplary embodiment, an emphasis level that is greater than or equal to a predetermined value).

Figure 7:
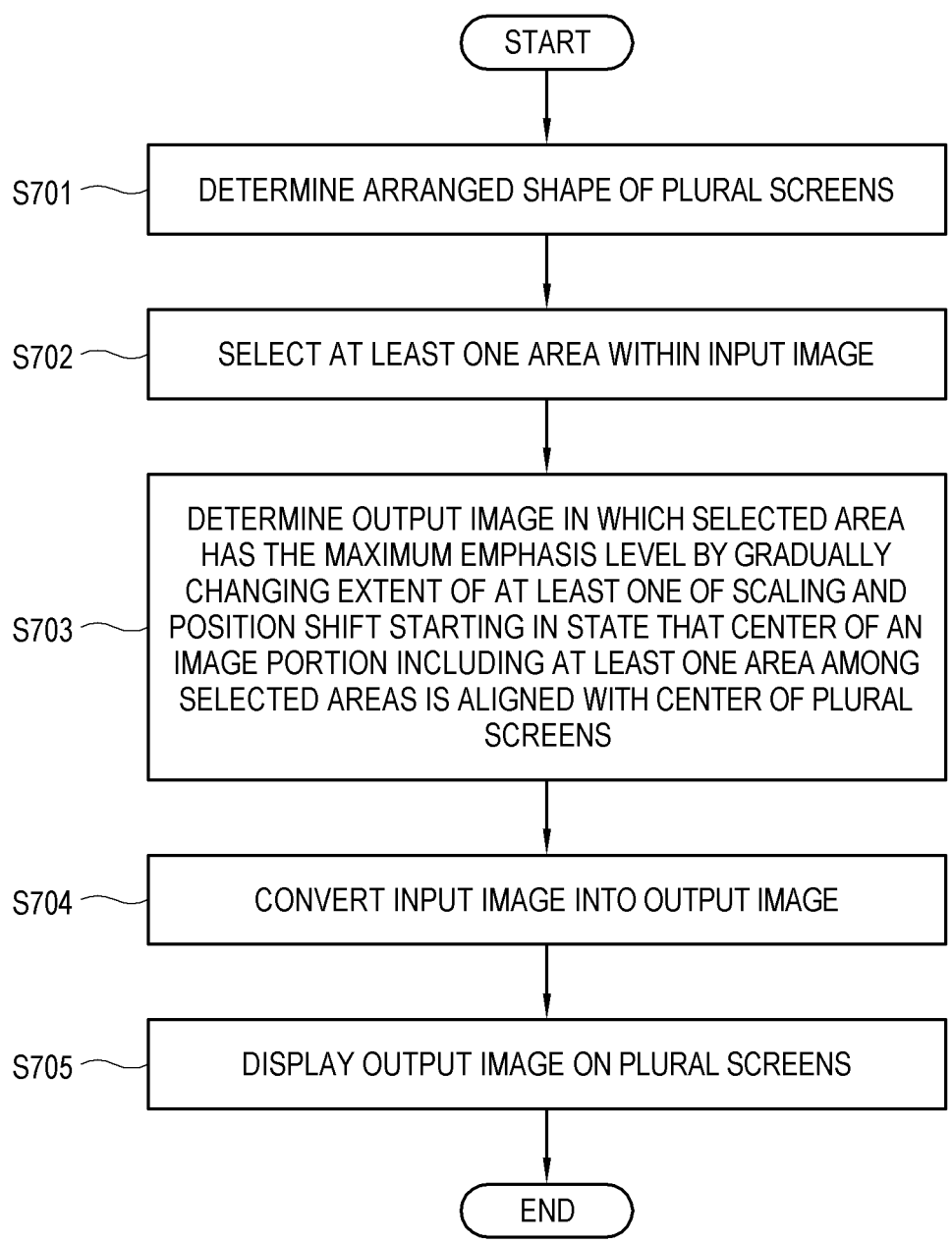
FIG. 7 illustrates a flowchart for a method of converting an input image into an output image according to another exemplary embodiment.

According to another exemplary embodiment, the output image searching job may be performed based on the selected area(s). FIG. 7 illustrates a flowchart for a method of determining the output image based on the selected area(s), according to an exemplary embodiment.

As with the exemplary embodiment illustrated in FIG. 6, the display apparatus according to the present exemplary embodiment determines or obtains the arranged shape of the plurality of screens (operation S701) and selects at least one area within an input image (operation S702). Unlike the exemplary embodiment illustrated in FIG. 6, however, the display apparatus determines the output image where the selected area(s) has the maximum emphasis level, while gradually changing the extent of at least one of the scaling and the position shift in the state that each center of the images including at least one area among the selected areas is aligned with the center of the plurality of screens (operation S703). Accordingly, the determination of the output image may begin around the selected area without considering all the cases of the scaling and the position shift possible within the conversion ranges since the purpose is to determine the output image in which the selected area has the maximum emphasis level.

For example, if the input image and the selected areas are as shown in FIG. 1, it is possible to improve the speed of determining the output image by beginning the determination of the output image in the state that each selected area is positioned on the center of the plurality of screens according to combinations of the selected areas. Regarding a partial image including only the first selected area, a partial image including only the second selected area, a partial image including only the third selected area, a partial image including the first and second selected areas, a partial image including the second and third selected areas, and a partial image including the first, second and third selected areas, the center of each image is aligned with the center of the plurality of screens. Starting from this alignment, candidates for the output image in which the selected area included in each of the partial images has the maximum emphasis level are selected with regard to every partial image, while gradually changing the extent of at least one of the scaling and the position shift as long as each partial image is within the plurality of screens. Then, the output image in which the selected area has the maximum emphasis level is determined among the candidates for the output image. By this method, the speed of determining the output image becomes faster since the number of determination jobs is decreased as compared with that of considering all the cases of the scaling and the position shift within the conversion ranges.

Details of determining the output image by calculating the emphasis level of each image according to the method described above with reference to FIG. 7 will now be described with reference to FIG. 8.

FIG. 8 at reference numeral 801 shows a first candidate for the output image determined by performing the output image searching job based on the partial image including the first, second and third selected areas. Furthermore, FIG. 8 at reference numeral 802 shows a second candidate for the output image determined by performing the output image searching job based on the partial image including the first and second selected areas. Additionally, FIG. 8 at reference numeral 803 shows a third candidate for the output image determined by performing the output image searching job based on the partial image including the second and third selected areas. Among the first, second and third candidates for the output image, an image for which the selected area has the maximum emphasis level is selected as the output image. This may be achieved by calculating and comparing the emphasis levels of the selected areas with respect to the candidates for the output image.

If the emphasis level of the selected area is calculated by multiplying, by each other, all of the level of the selected area occupying the screen, the level of the selected area closed to the center of the screen, and the importance level of the screen displaying the selected area, the processes and results of calculating the emphasis levels of the selected areas with respect to the first, second and third candidates for the output image are as shown in FIG. 8 at reference numerals 801, 802 and 803, respectively. Referring to FIG. 8, the second candidate is determined as the output image since the first, second and third selected areas in the second candidate have the maximum emphasis level.

The display apparatus according to the present exemplary embodiment may further reflect the importance level of the selected area in calculating the emphasis level of each selected area. Here, the importance level of the selected area may be obtained by digitizing at least one of the importance (e.g., relative to other portions of the image) of the selected area in the input image, how much the selected area plays a weighty role in the input image, how much viewers of the input image are interested in the selected area as compared with the other selected areas, and so on. The importance level of the selected area may be evaluated based on various criteria. For example, at least one of the sizes, positions, display frequencies, etc., of selected areas within the input image may be taken into account.

FIG. 9 illustrates an example of calculating the emphasis level of each selected area by additionally reflecting or considering the importance level of the selected area, according to an exemplary embodiment. Referring to FIG. 9 at reference numeral 901, the input image 120 and the selected areas 121-123 of the current example are as shown in FIG. 1. For example, each of the selected areas 121-123 indicates a character of a drama image. According to the present exemplary embodiment, the importance level may be given to or determined for the selected area in accordance with at least one of whether each character is a leading actor in the drama, how big the role of the character is in the drama, what size each selected area in the input image is, a determined amount of dialogue by and/or focus on the character, etc. FIG. 9 901 shows an example where the importance level given to each selected area ranges between the maximum of "1" and the minimum of "0," in which the importance levels of "0.9," "0.7" and "0.5" are respectively given to the first, second and third selected areas. The second selected area 122 occupies less of the input image 120 than the third selected area 123, but indicates or includes a character playing a bigger role than that of the third selected area 123. Therefore, the importance level of the second selected area 122 is greater than that of the third selected area 123.

FIG. 9 at reference numeral 902 shows an example of an output image 901 converted from the input image 120, and FIG. 9 at reference numeral 903 shows an example of calculating the emphasis level of the selected area by additionally considering the importance level of the selected area with respect to the output image 901. The present exemplary embodiment shows that the emphasis level of the selected area is calculated by reflecting or considering the importance level of the selected area in addition to the factors of the foregoing exemplary embodiment of FIG. 4, i.e., the occupying area level of the selected area relative to the combined screen and the closeness level of the selected area relative to the center of the combined screen. That is, the results of calculating the emphasis level of the selected area(s) vary depending on the three aforementioned factors, including the importance level of the selected area(s). Thus, the important portions of the selected area are further emphasized and displayed on the screen.

Figure 10:
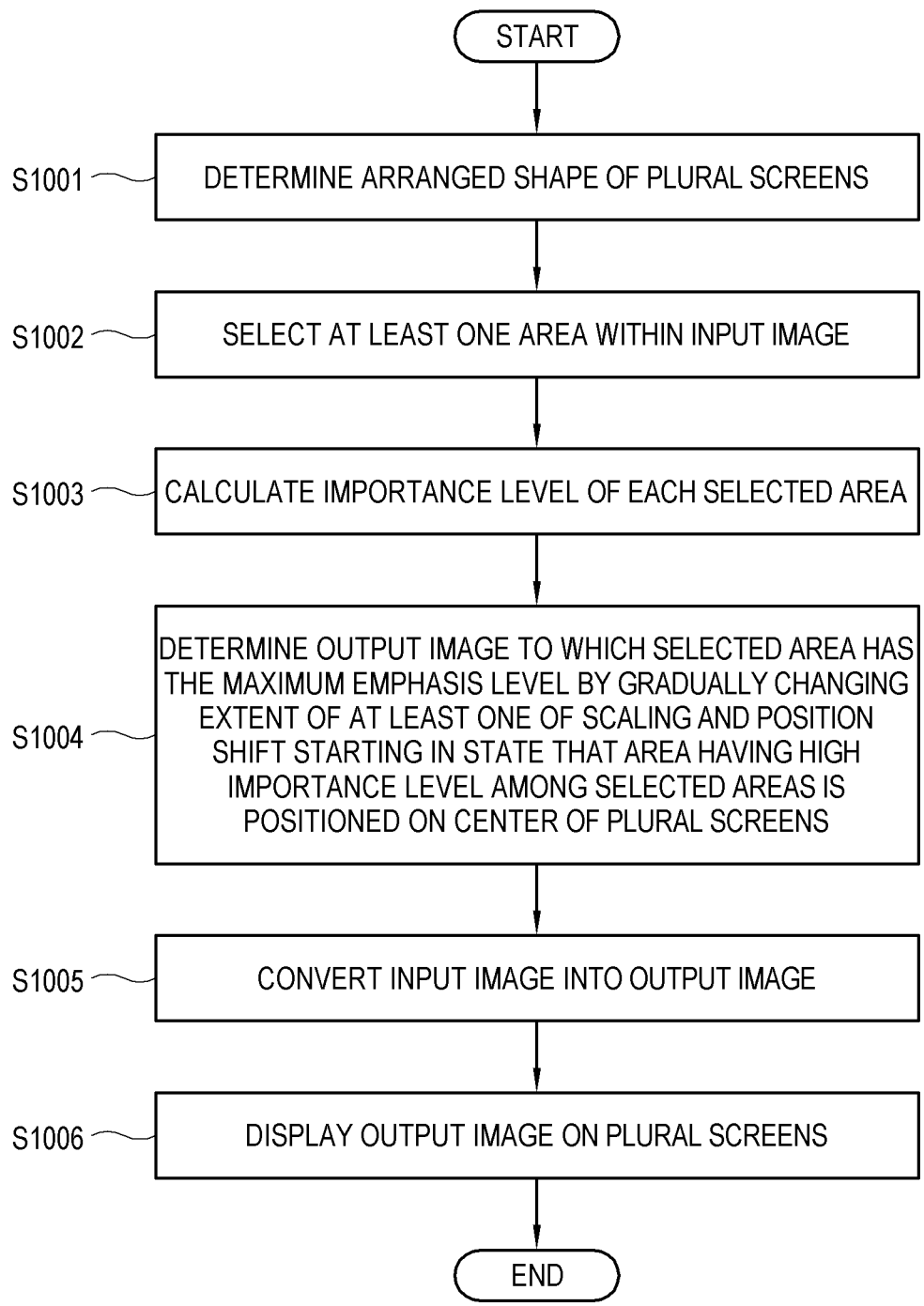
FIG. 10 illustrates a flowchart for a method of operating a display apparatus according to another exemplary embodiment.

Like the foregoing method of improving the speed of determining the output image based on the selected area(s) according to an exemplary embodiment (as illustrated in FIG. 7), it is possible to improve the speed of determining the output image based on the importance level of the selected area. FIG. 10 illustrates a flowchart for a method of converting an input image into an output image based on the importance level of a selected area(s) according to an exemplary embodiment.

Referring to FIG. 10, the display apparatus according to the present exemplary embodiment determines or obtains the arranged shape of the plurality of screens (operation S1001) and selects at least one area within an input image (operation S1002). Unlike the exemplary embodiments described above with reference to FIGS. 6 and 7, the display apparatus according to the present exemplary embodiment additionally calculates the importance level of each selected area (operation 1003) as shown in FIG. 10. Further, unlike the exemplary embodiments described above with reference to FIGS. 6 and 7, the display apparatus according to the present exemplary embodiment determines the output image corresponding to the maximum emphasis level while gradually changing the extent of at least one of the scaling and the position shift in the state that the area having a high importance level (unlike the exemplary embodiment described above with reference to FIG. 7) among the selected areas is positioned on the center of the plurality of screens, without performing the output image searching jobs within all the conversion ranges for the scaling and the position shift (operation S1004). Since the scaling and the position shift performed to center, on the plurality of screens, the area having a high importance level among the selected areas cause the emphasis level of the selected area to be raised, it is possible to improve the speed of the output image searching job by beginning the output image searching job from a condition where the emphasis level is likely to be high. As such, the output image searching job in a range where the area having a high importance level deviates from the plurality of screens is skipped or omitted. In addition, the output image may be determined by performing the output image searching job after positioning only one area having the highest importance level among the selected areas on the center of the output image. Further, the output image may be selected among the candidates for the output image, which are obtained by applying the output image searching jobs to the respective selected areas after positioning the selected areas on the center of the output image in order of importance levels.

In addition to or as an alternative to the scaling and/or the position shift as described above, the method of converting the input image into the output image may include partially cropping the input image. A part of the input image to be cropped may include an image positioned between one selected area and another selected area, and/or may include images on an exterior portion of the input image. In other words, the input image may be converted into the output image by cropping an image between two selected areas. This may be useful when a background is less important in the input image as compared with a foreground, for example, when the selected areas are all related to 3D objects and the background is meaningless. That is, to minimize a loss area not displayed on the screen among the selected areas of the foreground, the foreground having a high importance level can be displayed more than the background having a low importance level by conversion of controlling (e.g., cropping) a part of the background between the selected areas. Thus, the output image is displayed on the screen so that the selected area can have a higher emphasis level.

Figure 11:
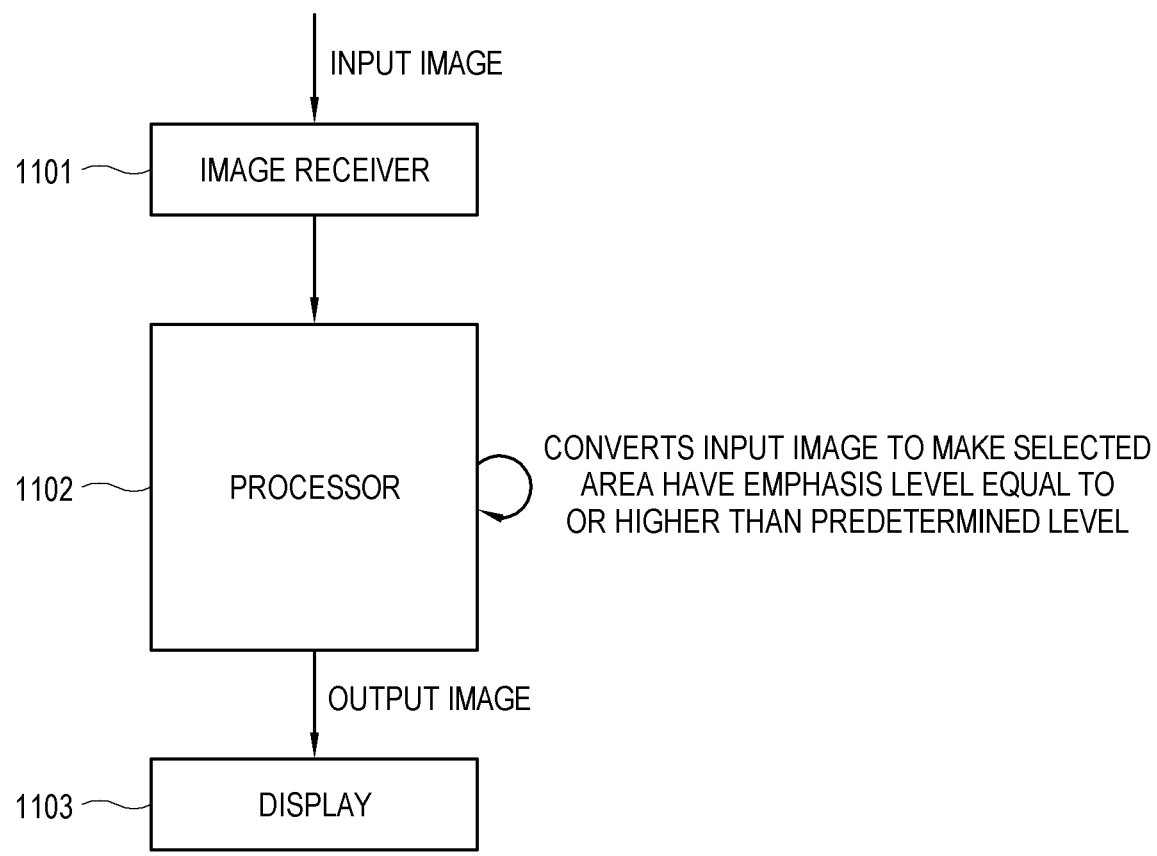
FIG. 11 illustrates a block diagram of components of the display apparatus according to an exemplary embodiment.

Below, the elements or components of the display apparatus according to an exemplary embodiment will be described with reference to FIG. 11. The display apparatus according to an exemplary embodiment includes an image receiver 1101, a processor 1102 (e.g., at least one hardware processor), and a display 1103. The display apparatus according to one or more exemplary embodiments may include elements different from or in addition to those shown in FIG. 11. That is, the display apparatus according to an exemplary embodiment may include another element in addition to those shown in FIG. 11, or exclude at least one from those shown in FIG. 11. In the present exemplary embodiment, a "module," a "unit," or any other displayed element may perform at least one function or operation, be materialized by hardware, software or combination of hardware and software, be realized in the form of a circuit or chip, and include at least one module to achieve or be implemented by at least one processor.

The image receiver 1101 receives an image signal including an input image. The image receiver 1101 may include a tuner for receiving an image signal. The tuner may be tuned to a certain channel selected by a user among a plurality of channels to receive a broadcasting signal. The image receiver 1101 may receive an image signal from an image processing device such as a set-top box, a digital versatile disc (DVD) player, a personal computer (PC), etc., a mobile device such as a smart phone, etc., or a server through the Internet.

The processor 1102 controls general elements of the display apparatus to operate, and applies various processes such as signal processing to the input image. A unit for performing the control may be provided inside the processor 1102, or may be provided separately from the processor 1102. The processor 1102 may include a program for implementing control and processing operations, a nonvolatile memory in which the program is installed, a volatile memory in which the installed program is at least partially loaded, and at least one microprocessor or central processing unit (CPU) for executing the loaded program. The program may include a program(s) given in the form of at least one a basic input/output system (BIOS), a device driver, an operating system (OS), a firmware, a platform, and an application program. According to an exemplary embodiment, the application program may be previously installed or stored in the display apparatus when the display apparatus is manufactured, or may be installed in the display apparatus based on data of the application program received when used (e.g., received from an outside source after manufacturing). The data of the application program may be for example downloaded from an external server such as an application market into the display apparatus.

According to an exemplary embodiment, the processor 1102 controls the image receiver 1101 to receive the input image. Further, the processor 1102 controls the display 1103 to display the output image, which is converted from the input image to correspond to the arranged shape of the plurality of screens and in which at least one area selected from the input image has an emphasis level greater than or equal to a predetermined level, on the plurality of screens.

The display 1103 displays an image. The display 1103 may be for example variously materialized by or include liquid crystal, plasma, a light-emitting diode (LED), an organic light-emitting diode (OLED), a surface-conduction electron-emitter, a carbon nano-tube, a nano-crystal, and the like various display types without limitations. In the case of the liquid crystal type, the display 1103 may include a liquid crystal display (LCD) panel, a backlight unit for emitting light to the LCD panel, a panel driving substrate for driving the LCD panel, etc. Alternatively, the display 1103 may be materialized in an OLED panel without the backlight unit.

Figure 12:
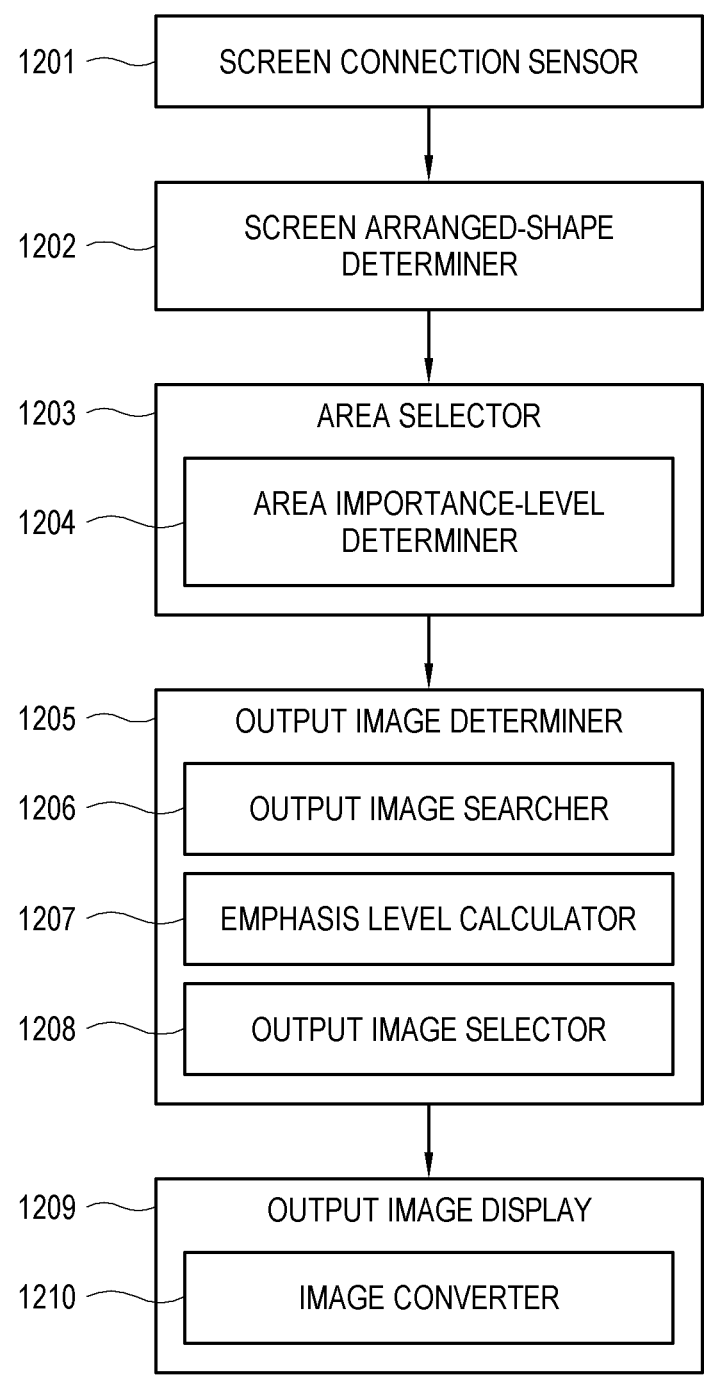
FIG. 12 illustrates a block diagram of components of a processor in a display apparatus according to an exemplary embodiment.

FIG. 12 shows a detailed block diagram of the processor 1102 in the display apparatus according to an exemplary embodiment. The processor 1102 of the display apparatus according to an exemplary embodiment may include a screen connection sensor 1201, a screen arranged-shape determiner 1202, an area selector 1203, an output image determiner 1205, and an output image display 1209. The area selector 1203 may include an area importance-level determiner 1204. The output image determiner 1205 may include an output image searcher 1206, an emphasis level calculator 1207, and output image selector 1208. The output image display 1209 may include an image converter 1210.

The screen connection sensor 1201 senses whether the screen is connected to or separated from the display apparatus. The screen arranged-shape determiner 1202 determines the arranged shape of the combined screen (e.g., at least one of a relative position of each of the screens included in the combined screen, a relative size of each of the screens included in the combined screen, etc.). The area selector 1203 selects the selected area within the input image, and includes the area importance-level determiner 1204 for determining the importance level of each selected area occupying the input image. The output image determiner 1205 determines the output image based on the emphasis level of the selected area(s) (e.g., the emphasis level of the selected area(s) for each of plural candidate output images). If the output image determiner 1205 includes the output image searcher 1206, the emphasis level calculator 1207, the output image selector 1208, the output image searcher 1206 searches an output image while gradually changing the extent of at least one of the scaling and the position shift within a predetermined range. Furthermore, the emphasis level calculator 1207 calculates emphasis levels of candidates for the output image. Additionally, the output image selector 1208 selects one of the candidates for the output image. The output image display 1209 displays the determined output image on the plurality of screens. If the output image display 1209 includes the image converter 1210, the image converter 1210 converts the input image in accordance with the determined output image.

Figure 13:
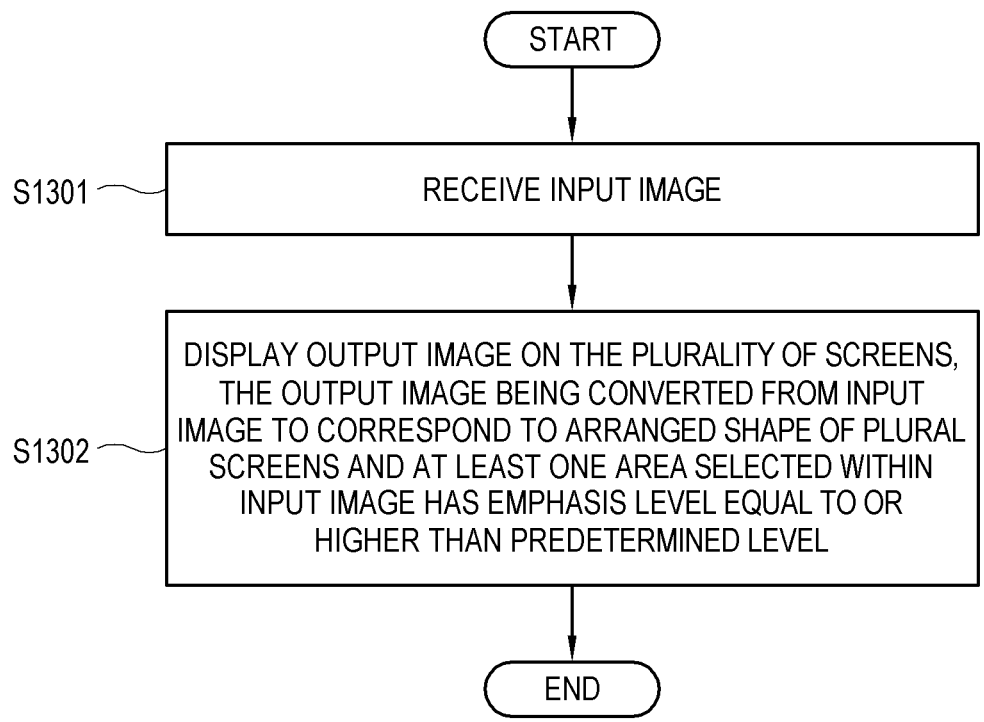
FIG. 13 illustrates a flowchart for a method of controlling a display apparatus according to an exemplary embodiment.

FIG. 13 illustrates a flowchart of a method for controlling a display apparatus according to an exemplary embodiment. Referring to FIG. 13, the display apparatus receives an input image (operation S1301), and displays an output image, which is converted from the input image according to to the arranged shape of the plurality of screens and in which at least one area selected within the input image has an emphasis level greater than or equal to a predetermined level, on a plurality of screens (operation S1302).

As described above, according to an exemplary embodiment, an image is displayed with less loss on a plurality of screens.

Further, according to an exemplary embodiment, an image is displayed with minimum loss of an important portion on a plurality of screens.

Although a few exemplary embodiments have been shown and described, it will be appreciated by those skilled in the art that changes may be made in these exemplary embodiments. For example, exemplary embodiments described above may be implemented in different order from those of the foregoing methods. Further, the elements of the system, structure, apparatus, circuit or the like may be assembled or combined in different form from those of the foregoing descriptions system, or may be replaced or substituted with other elements or their equivalents. Therefore, the present inventive concept is not limited to the foregoing exemplary embodiments and the accompanying drawings, and it will be appreciated that other materializations, other embodiments, appended claims and their equivalents belong to the scope of claims. Further, the foregoing disclosures are presented to be taken into account not for limitative purposes, but illustrative purposes.

What is claimed is:
1. A display apparatus comprising:
a plurality of screens;
an image receiver configured to receive an input image; and a processor configured to:
  identify a main screen of the plurality of screens based on an arranged shape of the plurality of screens,
  identify a main area of the input image,
  identify an emphasis level indicating how much the identified main area corresponds to the main screen,
  generate an output image from the input image having the identified emphasis level of the main area which is greater than or equal to a predetermined level, the generated output image having a same shape as the arranged shape of the plurality of screens, and
  output the generated output image for display on the plurality of screens.

2. The display apparatus according to claim 1, wherein the processor is further configured to generate the output image from the input image such that the main area in the output image has the emphasis level greater than or equal to the predetermined level, and determine the emphasis level based on at least one of:
  how much the main area occupies the plurality of screens;
  how close the main area is to a center of the plurality of screens; and
  an importance level of a screen, among the plurality of screens, for displaying the main area.

3. The display apparatus according to claim 2, wherein the processor is further configured to determine the emphasis level based on an importance level of the main area.

4. The display apparatus according to claim 3, wherein the importance level of the main area comprises at least one of a size, a position, and a display frequency of the main area in the input image.

5. The display apparatus according to claim 1, wherein the processor is further configured to generate the output image from the input image by performing at least one of scaling the input image and a position shift for the input image on the plurality of screens.

6. The display apparatus according to claim 5, wherein the processor is further configured to determine the output image as having a greatest emphasis level, determined by the processor, from among a plurality of candidate output images obtained by gradually changing an extent of at least one of the scaling and the position shift.

7. The display apparatus according to claim 5, wherein the processor is further configured to determine the output image as having a greatest emphasis level from among a plurality of candidate output images obtained by gradually changing an extent of at least one of the scaling and the position shift starting from a state in which a center of the main area of the input image is aligned with a center of the plurality of screens.

8. The display apparatus according to claim 5, wherein the processor is further configured to determine the output image as having a greatest emphasis level from among a plurality of candidate output images obtained by gradually changing an extent of at least one of the scaling and the position shift from a state in which the main area is positioned on a center of the plurality of screens.

9. The display apparatus according to claim 1, wherein the processor is further configured to crop a portion of the input image to generate the output image.

10. The display apparatus according to claim 9, wherein the cropped portion of the input image comprises the main area.

11. A method of controlling a display apparatus comprising a plurality of screens, the method comprising:
  receiving an input image;
  identifying a main screen of the plurality of screens based on an arranged shape of the plurality of screens;
  identifying a main area of the input image;
  identifying an emphasis level indicating how much the identified main area corresponds to the main screen;
  generating an output image from the input image having the identified emphasis level of the main area which is greater than or equal to a predetermined level, the generated output image having a same shape as the arranged shape of the plurality of screens; and
  outputting the generated output image for display on the plurality of screens.

12. The method according to claim 11, wherein the generating comprises generating the output image from the input image such that the main area in the output image has the emphasis level greater than or equal to the predetermined level, and determining the emphasis level based on at least one of:
  how much the main area occupies the plurality of screens;
  how close the main area is to a center of the plurality of screens; and
  an importance level of a screen, among the plurality of screens, for displaying the main area.

13. The method according to claim 11, wherein the generating comprises generating the output image from the input image by performing at least one of scaling the input image and a position shift for the input image on the plurality of screens.

14. The method according to claim 13, wherein the generating further comprises determining the output image as having a greatest emphasis level from among a plurality of candidate output images obtained by gradually changing an extent of at least one of the scaling and the position shift.

15. The method according to claim 13, wherein the generating further comprises determining the output image as having a greatest emphasis level from among a plurality of candidate output images obtained by gradually changing an extent of at least one of the scaling and the position shift starting from a state in which a center of an image portion comprising the main area of the input image is aligned with a center of the plurality of screens.

16. The method according to claim 13, wherein the generating further comprises determining the output image as having a greatest emphasis level from among a plurality of candidate output images obtained by gradually changing an extent of at least one of the scaling and the position shift from a state in which the main area is positioned on a center of the plurality of screens.

17. The method according to claim 11, wherein the generating further comprises determining the emphasis level based on an importance level of the main area.

18. The method according to claim 17, wherein the importance level of the main area comprises at least one of a size, a position, and a display frequency of the main area in the input image.

19. The method according to claim 11, wherein the generating comprises cropping a portion of the input image to generate the output image.

20. The method according to claim 19, wherein the cropped portion of the input image comprises the main area.

* * * * *